(12) United States Patent
Zander (10) Patent No.: US 12,345,288 B2
(45) Date of Patent: Jul. 1, 2025

(54) BLANKET FASTENER

(71) Applicant: Illinois Tool Works Inc., Glenview, IL (US)

(72) Inventor: Jason M. Zander, Roberts, WI (US)

(73) Assignee: Illinois Tool Works Inc., Glenview, IL (US)

( * ) Notice: Subject to any disclaimer, the term of this patent is extended or adjusted under 35 U.S.C. 154(b) by 360 days.

(21) Appl. No.: 17/714,270

(22) Filed: Apr. 6, 2022

(65) Prior Publication Data
US 2022/0356891 A1    Nov. 10, 2022

Related U.S. Application Data (60) Provisional application No. 63/185,553, filed on May 7, 2021.

(51) Int. Cl.
*F16B 5/06* (2006.01)
*B60R 13/08* (2006.01)
*F16B 21/08* (2006.01)

(52) U.S. Cl.
CPC ........ *F16B 5/0664* (2013.01); *B60R 13/0838* (2013.01); *F16B 21/084* (2013.01); *B60R 2013/0807* (2013.01)

(58) Field of Classification Search
CPC .... F16B 21/084; F16B 21/086; F16B 5/0642; F16B 5/0664; B60R 2013/0807; B60R 13/0206; B60R 13/0838
See application file for complete search history.

(56) References Cited

U.S. PATENT DOCUMENTS

| 4,925,465 | A | * | 5/1990 | Liskey | B01D 53/0407 |
| | | | | | 96/147 |
| 5,195,857 | A | * | 3/1993 | Hiramoto | F16B 21/086 |
| | | | | | 411/173 |
| 6,804,864 | B2 | * | 10/2004 | Kirchen | F16B 5/0642 |
| | | | | | 24/297 |

(Continued)

FOREIGN PATENT DOCUMENTS

| CN | 107850100 A | 3/2018 |
| JP | 2006300169 A | 11/2006 |

OTHER PUBLICATIONS

International Preliminary Report on Patentability, with an issuance date of Nov. 16, 2023, in International application No. PCT/US2022/023761, filed on May 7, 2021 (10 pages).

(Continued)

*Primary Examiner* — Matthew R Mcmahon
(74) *Attorney, Agent, or Firm* — McAndrews, Held & Malloy, Ltd.

(57) ABSTRACT

A fastener for attaching a first panel to a second panel comprises: a cap; a shank defining a central longitudinal axis that is substantially perpendicular to the cap; a pair of wings resiliently coupled to the shank at a distal end thereof and configured to retain the fastener relative to the second panel, wherein the pair of wings comprises a first wing and a second wing angled away from the central longitudinal axis; a first fin resiliently coupled to and angled away from the first wing; and a second fin resiliently coupled to and angled away from the second wing, wherein the first fin and the second fin are configured to retain the fastener relative to the first panel.

19 Claims, 9 Drawing Sheets

(56) References Cited

U.S. PATENT DOCUMENTS

| | | | |
|---|---|---|---|
| 7,086,125 B2* | 8/2006 | Slobodecki | B60R 13/0206 |
| | | | 24/295 |
| 7,186,068 B2* | 3/2007 | Zoubek | F16B 21/086 |
| | | | 411/510 |
| 7,594,629 B2* | 9/2009 | Smutny | H02G 3/30 |
| | | | 248/71 |
| 9,145,909 B2* | 9/2015 | Lepper | F16B 21/082 |
| 9,434,323 B2* | 9/2016 | Huchet | F16B 2/245 |
| 9,440,596 B2* | 9/2016 | Huelke | F16B 2/241 |
| 9,695,850 B2* | 7/2017 | Hirakawa | F16B 5/06 |
| 10,641,308 B2* | 5/2020 | Sugimoto | F16B 21/086 |
| 2015/0283884 A1* | 10/2015 | Machida | F16B 5/123 |
| | | | 296/97.9 |
| 2016/0144801 A1 | 5/2016 | Huelke et al. | |
| 2022/0397146 A1* | 12/2022 | Leidig | F16B 21/086 |

OTHER PUBLICATIONS

PCT, International Search Report and Written Opinion regarding PCT Application No. PCT/US2022/023761, dated Jun. 30, 2022, 11 pages.

* cited by examiner

BLANKET FASTENER

CROSS-REFERENCE

The present application claims the benefit under 35 U.S.C. § 119(e) of U.S. Provisional Patent Application Ser. No. 63/185,553, filed May 7, 2021, and entitled "Hood Blanket Clip," the contents of which are hereby incorporated by reference.

BACKGROUND

Automotive components require fastening techniques that are simple to manufacture and assemble. Further, fastening techniques should above all be reliable and efficient. In order to secure a secondary panel to a primary panel, a fastener may be used, such as a clip fastener.

To increase assembly time for the end-user, the fastener may be pre-attached to the secondary panel at the factory to define a part-in-assembly (PIA) before shipment to the end-user. Depending on the materials, it is sometimes less feasible to provide a secondary panel with existing fastener types as a PIA because the fastener can become loose and fall off of the secondary panel during shipment. For example, it can be difficult to secure a fastener to a soft secondary panel that may have larger and/or less defined openings, such as automotive hood pad insulators.

Despite various advancements to date, it would nevertheless be desirable to provide a fastener that can be used with such secondary panels to form a PIA, while not otherwise impacting subsequent attachment to a primary panel by the end-user.

SUMMARY

The present disclosure relates generally to a fastener that may be pre-attached to a secondary panel to define a part-in-assembly, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DESCRIPTION

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

A fastener can be used to attach a first panel and a second panel, such as automotive panels. In one example, a fastener for attaching a first panel to a second panel comprises a cap, a shank, a pair of wings, a first fin, and a second fin. The shank defines a central longitudinal axis that is substantially perpendicular to the cap. The pair of wings are resiliently coupled to the shank at a distal end thereof and configured to retain the fastener relative to the second panel. The pair of wings comprises a first wing and a second wing angled away from the central longitudinal axis. The first fin resiliently coupled to and angled away from the first wing and the second fin resiliently coupled to and angled away from the second wing. The first fin and the second fin are configured to retain the fastener relative to the first panel. In some examples, the fastener is attached to the first panel to form a part-in-assembly (PIA) component.

In some examples, the first fin and the second fin are configured to collapse against a respective one of the first wing and the second wing during insertion of the pair of wings through an opening formed in the first panel. In some examples, each of the first wing and the second wing defines a recess configured to receive a respective one of the first fin and the second fin during collapse thereof. In some examples, the fastener further comprises a pair of whiskers resiliently coupled to the shank and angled away from the central longitudinal axis. The pair of whiskers may be in addition to or in lieu of the pair of wings. In some examples, each of the pair of whiskers is substantially perpendicular to the central longitudinal axis. In some examples, each of the pair of whiskers is configured to collapse against the shank during insertion of the pair of wings through an opening formed in the first panel. In some examples, the shank defines at least one recess configured to receive at least one of the pair of whiskers during collapse thereof.

Figure 1A:
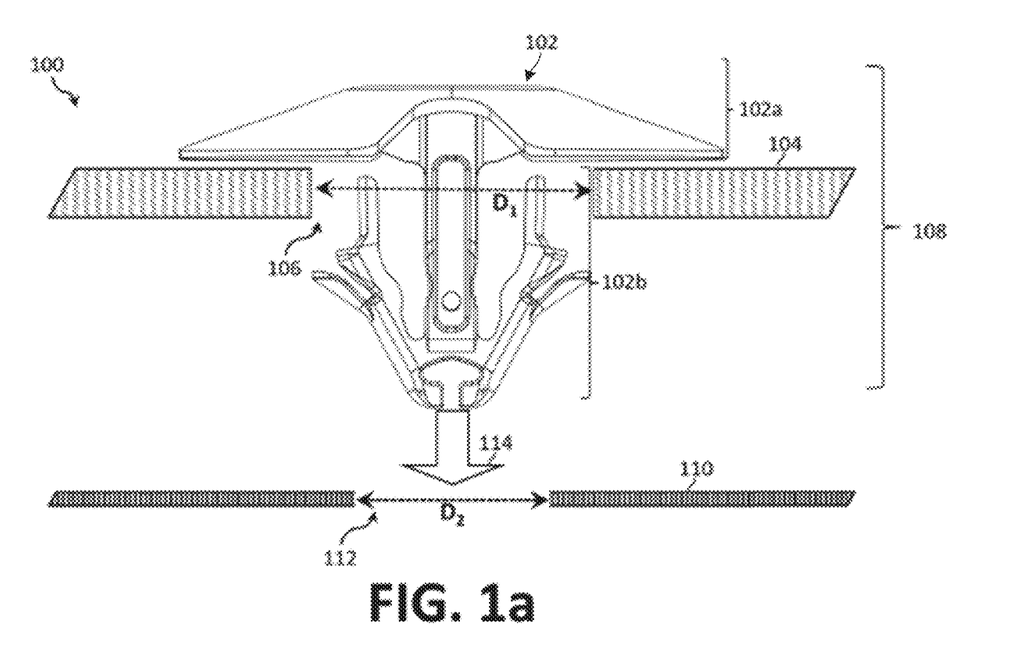
FIGS. 1a and 1b illustrate side views of example fastening systems configured to form a connection between panels in accordance with aspects of this disclosure.
Figure 1B:
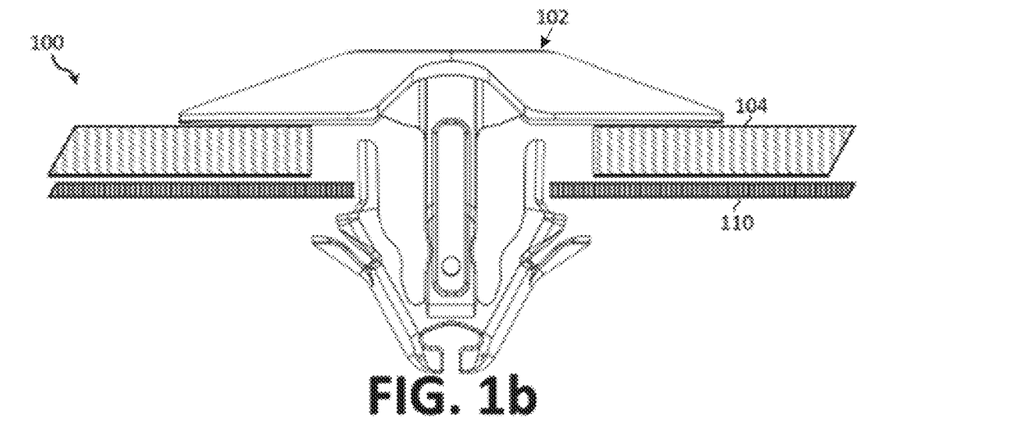

FIGS. 1a and 1b illustrate side views of an example fastening system 100 having a fastener 102 configured to join a first panel 104 to a second panel 110. Specifically, FIG. 1a illustrates a first panel 104 with a fastener 102 pre-attached to define a part-in-assembly (PIA) component 108, while FIG. 1b illustrates the PIA component 108 fully assembled with a second panel 110. The PIA component 108 may be pre-assembled at the factory and shipped to an end-user for final assembly with the first panel 110.

The first panel 104 and the second panel 110 may be, for example, automotive panels. Depending on the application, the first panel 104 and/or the second panel 110 may be fabricated from, for example, metal (or a metal alloy), synthetic or semi-synthetic polymers (e.g., plastics, such as acrylonitrile butadiene styrene (ABS) and polyvinyl chloride (PVC), etc.), composite materials (e.g., fiber glass), or a combination thereof. In the automotive industry, example first panels 104 include, without limitation, pads, blankets, door trim panels, moldings, trim pieces, and other substrates (whether used as interior or exterior surfaces). In some examples, the first panel 104 is an automotive hood blanket, which may be attached to the underside of an automotive hood and used to dissipate heat from the engine, reduce engine noise, etc. The fastener 102 may be fabricated from a generally rigid material, such as synthetic or semi-synthetic polymers, composite materials, or a combination thereof.

To receive the fastener 102, the first panel 104 includes one or more first openings 106 and the second panel 110 includes one or more second openings 112. As illustrated, the first openings 106 of the first panel 104 may have a first diameter ($D_1$) that is greater than a second diameter ($D_2$) of the second openings 112 on the second panel 110. The difference in opening sizes can be to increase assembly tolerances or be a result of the type of material used to form the panels. For example, in the case of an automotive hood blanket, the materials used to form the first panel 104 are often soft relative to the second panel 110 and can produce first openings 106 that are not well-defined, can stretch, or the like.

As illustrated, the fastener 102 generally includes a head assembly 102a and a clip assembly 102b. The clip assembly 102b extends away from the underside of the head assembly 102a. The head assembly 102a and the clip assembly 102b may be manufactured as a single component or as separate components and joined thereafter (e.g., through adhesives, welding, etc.). In some examples, the fastener 102 may be pre-attached to the first panel 104 to define a part-in-assembly (PIA) component 108. To form the PIA component 108, the clip assembly 102b is first passed through the first opening 106 in the first panel 104 in the direction indicated by arrow 114. As illustrated, the head assembly 102a is wider than the first diameter ($D_1$) it prevent the entire fastener 102 from passing through the first opening 106.

The PIA component 108 can then be attached to the first panel 110 by passing the clip assembly 102b through the second opening 112 in the first panel 104 as indicated by arrow 114. For example, the PIA component 108 is configured to engage the second opening 112 of a second panel 110 via the clip assembly 102b of the fastener 102. In operation, the clip assembly 102b is inserted into the second opening 112 of the second panel 110 to, in effect, lock the fastener 102 in place within the second opening 112, thus securing the first panel 104 and the second panel 110 to one another. For example, the clip assembly 102b can be snapably secured within a second opening 112 formed in the second panel 110.

The second panel 110 may be, for example, a structural component of a vehicle, such as a hood, doors, pillars (e.g., an A-pillar, B-pillar, C-pillar, etc.), dashboard components (e.g., a cross member, bracket, frame, etc.), seat frames, center consoles, fenders, sheet metal framework, or the like. After assembly, as best illustrated in FIG. 1b, the second panel 110 is covered at least partially by the first panel 104.

The clip assembly 102b is sized and shaped to correspond generally to the second openings 112 on the second panel 110 rather than the first opening 106, as a result, the clip assembly 102b is sometimes smaller than the first opening 106. As a result, historically, the fastener 102 would sometimes fall out of the first panel 104 during shipment, thus defeating the purpose of shipping a PIA component 108. To that end, as disclosed herein, the fastener 102 further comprises one or more PIA-retention features to engage the first opening 106 of a first panel 104 to thereby retain the fastener 102 relative to the first panel 104 as a PIA component 108 during shipment. In some examples, as will be discussed, the PIA-retention features include fins and/or whiskers configured to prevent the fastener 102 from falling out of the panel 104 during shipment, movement within a facility, and the like.

Figure 2A:
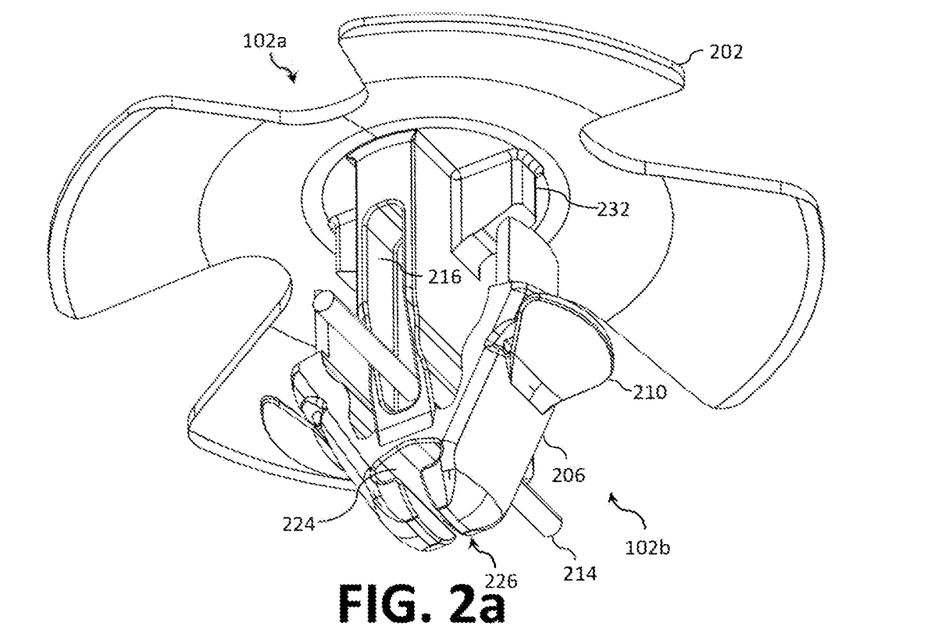
FIGS. 2a and 2b illustrate, respectively, underside and topside isometric views of the fastener accordance with aspects of this disclosure.
Figure 2B:
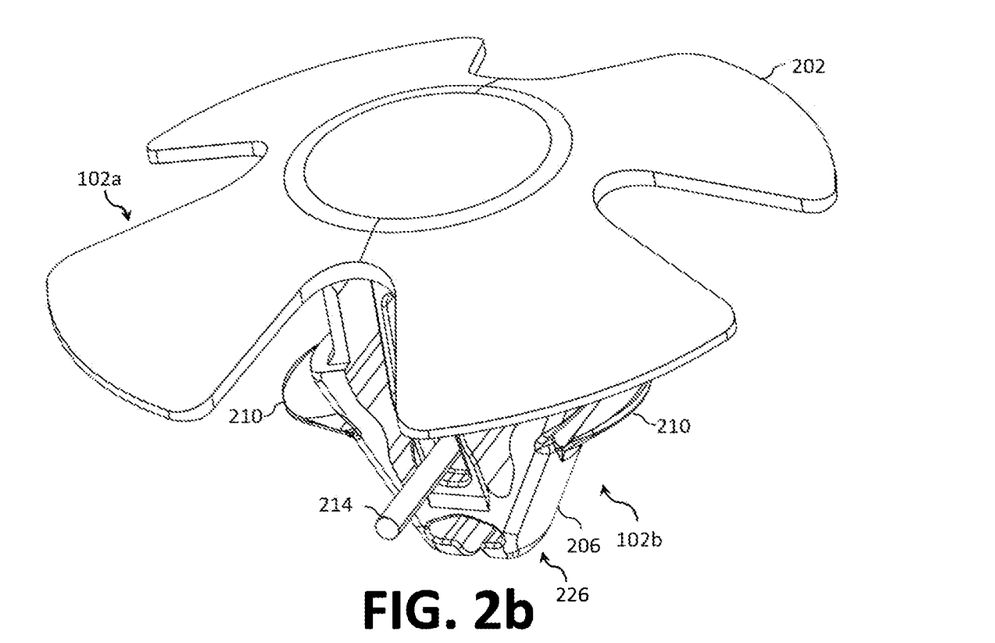

FIGS. 2a and 2b illustrate, respectively, underside and topside isometric views of the fastener 102. FIGS. 2c through 2f illustrate first, second, third, and fourth side elevation views of the fastener 102. FIGS. 2g and 2h illustrate, respectively, top and bottom plan views of the fastener 102. The fastener 102 generally includes a cap 202, a shank 204, a pair of wings 206, and one or more PIA-retention features. For ease of illustration, the first panel 104 and the second panel 110 are omitted to better illustrate the elements of the fastener 102. While the one or more PIA-retention features will be described as fins 210 and/or whiskers 214, other arrangements and shapes are contemplated.

The cap 202 is sized and shaped to provide adequate contact with the first panel 104 and to ensure that the cap 202 does not pass through the first opening 106. In some examples, the width of the cap 202 is at least 50 percent larger than the first diameter ($D_1$) of the first opening 106 (i.e., 1.5 times the first diameter ($D_1$)). In other examples, the cap 202 is 100 percent larger than the first diameter ($D_1$) of the first opening 106 (i.e., twice the first diameter ($D_1$)). The cap 202 may be clover shaped (as illustrated), circular, square, etc. In some examples, the cap 202 may be concave to provide a compressive force to the first panel 104 via the perimeter of the cap 202 when the fastener 102 is coupled to the second panel 110. Those skilled in the art will appreciate, in view of this disclosure, that the profile and surface contours of head assembly 102a may be formed in a variety of configurations.

The clip assembly 102b includes an elongated shank 204, two or more wings 206 formed at an end thereof, and one or more PIA-retention features. The shank 204 projects away from the cap 202 such that the cap 202 is oriented substantially perpendicularly to a central longitudinal axis 222 defined by the shank 204. That is, the shank 204 defines a central longitudinal axis 222 that is substantially perpendicular to the cap 202. The shank 204 may be formed integrally with the head assembly 102a, or alternatively, may be adhered or screwed into a threaded hole in the head assembly 102a. A pair of ribs 232 are provided on each side of the shank 204 to secure the shank 204 relative to the head assembly 102a.

The pair of wings 206 are resiliently coupled to the shank 204 at a distal end 226 of the shank 204. The pair of wings 206 allow for resilient lateral deflection thereof relative to the central longitudinal axis 222 of elongated shank 204 during insertion and removal from a second opening 112 in the second panel 110. In some examples, the pair of wings 206 comprises a first wing 206a and a second wing 206b angled away from the central longitudinal axis 222. As illustrated, the wings 206 extend upwardly in angled relation away from the end of the shank 204. Each wing 206 may further include a tapered section having a widened end portion to effectuate retention of clip assembly 102b within the second opening 112 in the second panel 110, and to also prevent inadvertent withdrawal of clip assembly 102b from the second opening 112. As illustrated, the distal end of each of the first wing 206a and the second wing 206b includes a ledge 208 to press against the first panel 110 when assembled.

In the illustrated construction, each of the wings 206 incorporates an outer face facing generally outwardly away from the shank 204. Each wing 206 defines a wing axis 228 extending in angled relation away from the central longitudinal axis 222 defined by the shank 204. Those skilled in the art further will appreciate, in view of this disclosure, that the configuration, profile and surface contours of the clip assembly 102b may be formed in a variety of configurations. For example, the clip assembly 102b of the fastener 102 may be fabricated in various sizes and/or shapes depending on the application. In some examples, the clip assembly 102b is configured as a "W-type" fastener (as illustrated), a push pin fastener (sometimes called trees, pine trees, Christmas trees, etc.), a pin and grommet (P&G) fastener, a box-prong fastener, and a specialty fastener (e.g., a CenterLok™ fastener, which is available from Deltar®).

At a distal end 226 of shank 204, a deflection controlling recess 224 can be provided, extending inwardly from the distal end 226. The shape and size of recess 224 is controlled for creating multiple flex points for deflection of wings 206 during installation and removal. By controlling the shape and size of recess 224, desired forces for insertion and removal can be achieved. A generally keyhole shaped recess 224 is shown, and has been found to perform satisfactorily in at least some applications and uses, but other shapes are possible.

In some examples, the PIA-retention features are provided as a set of fins 210. The PIA-retention features may be embodied as a first fin 210 resiliently coupled to and angled away from the first wing 206a and a second fin 210 resiliently coupled to and angled away from the second wing 206b. The set of fins 210 serve to, in effect, widen the overall width of the clip assembly 102b. To that end, each fin 210 defines a fin axis 230 extending in angled relation away from the wing axis 228 defined by the wings 206. Each of the first and second fins 210 are coupled to the respective first and second wings 206a, 206b at its proximal end 210b such that its distal ends 210a flare outwardly. As illustrated, the first and second fins 210 are offset by about 180 degrees about the central longitudinal axis 222 such that the first and second fins 210 are oriented in opposite directions. The width ($W_1$) between the distal ends 210a of the first and second fins 210 is greater than the width of the first diameter ($D_1$).

Figure 2C:
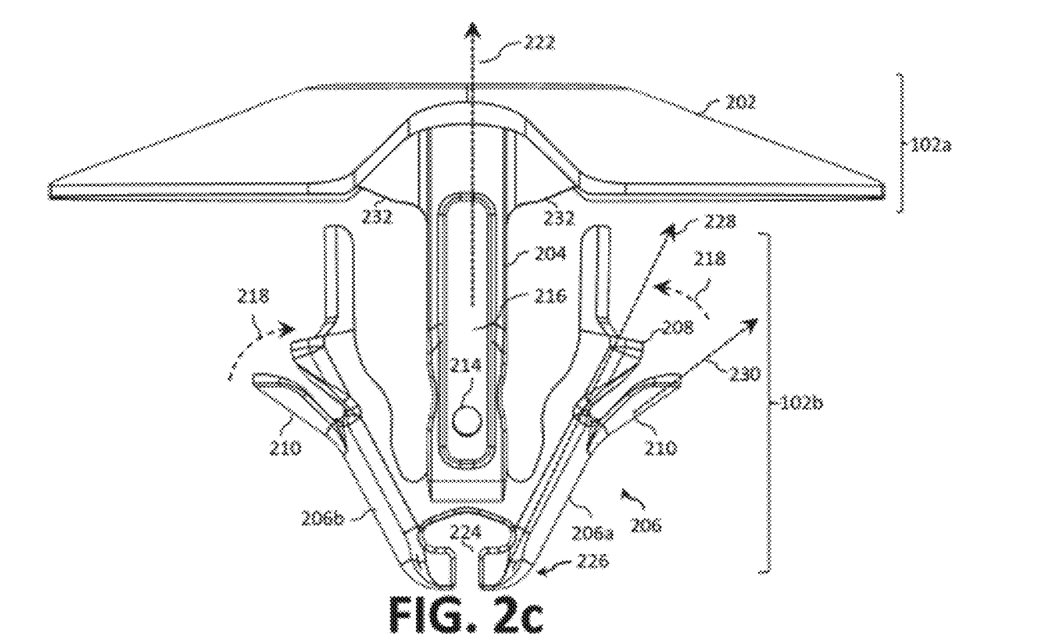
FIGS. 2c through 2f illustrate first, second, third, and fourth side elevation views of the fastener of FIGS. 2a and 2b.
Figure 2D:
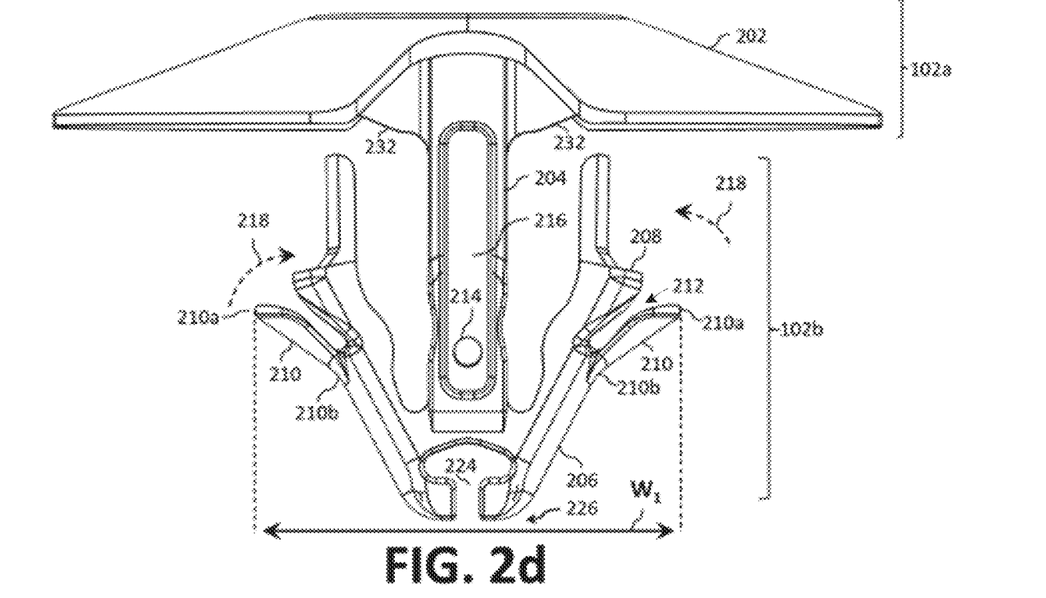

As best illustrated in FIGS. 2c and 2d, the first fin 210 and the second fin 210 are configured to flex at the proximal ends 210b to collapse against a respective one of the first wing 206a and the second wing 206b as indicated by arrows 218 during insertion of the pair of wings 206 through a second opening 112 formed in the first panel 110. In some examples, the first wing 206a and/or the second wing 206b define a recess 212 configured to receive a respective one of the first fin 210 and the second fin 210 during collapse thereof.

The first and second wings 206a, 206b should be resiliently coupled to the respective wings 206 such that they do not increase the insertion force necessary to insert the clip assembly 102b through the second opening 112 of the second panel 110. For example, the first and second wings 206a, 206b can be angled such that they collapse easily in the direction indicated by arrows 218, but resist bending forces in a direction opposite of that indicated by arrows 218. As a result, the fastener 102 would remain secured in the first opening 106 during shipping of the PIA component 108, but would not make it more difficult for an end-user to assemble the PIA component 108 with the second panel 110.

Figure 2E:
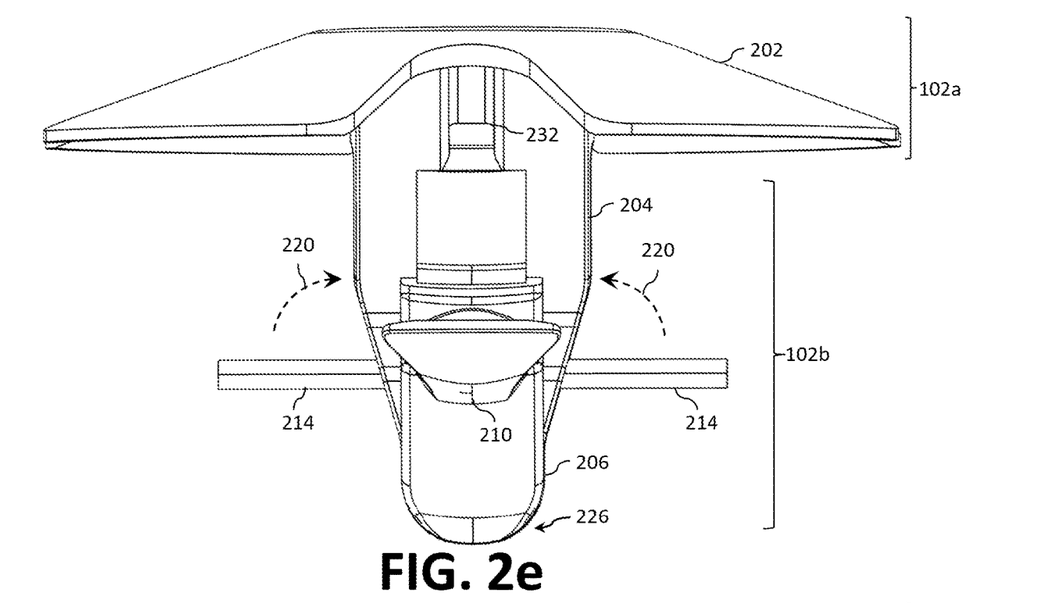
Figure 2F:
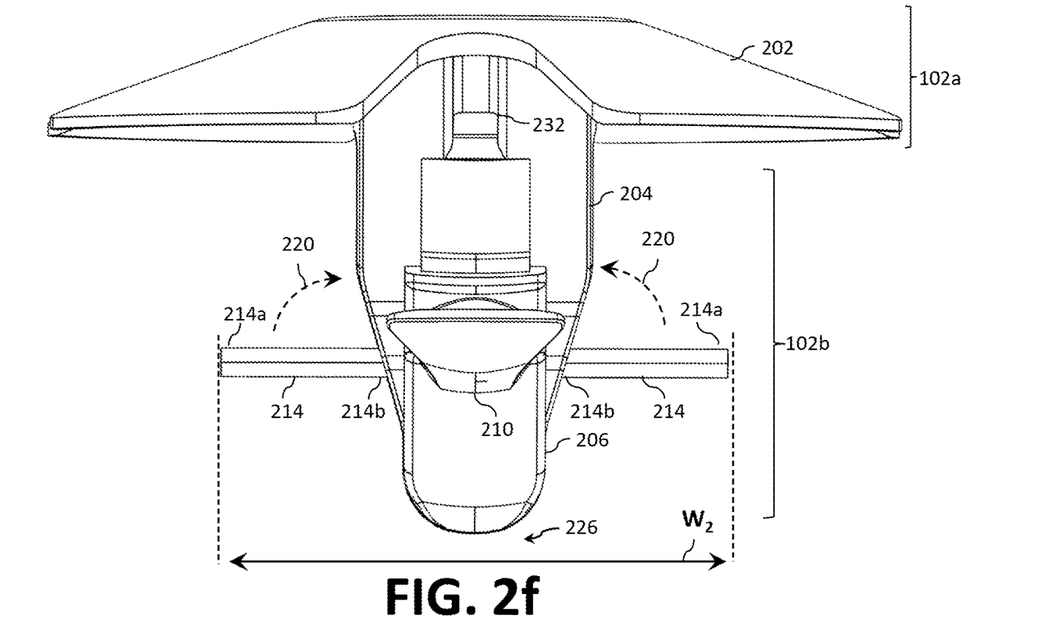
Figure 2G:
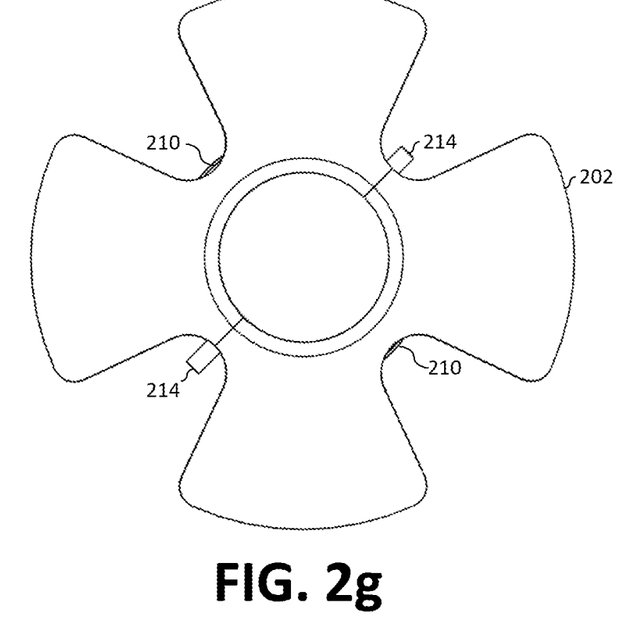
FIGS. 2g and 2h illustrate, respectively, top and bottom plan views of the fastener of FIGS. 2a and 2b.
Figure 2H:
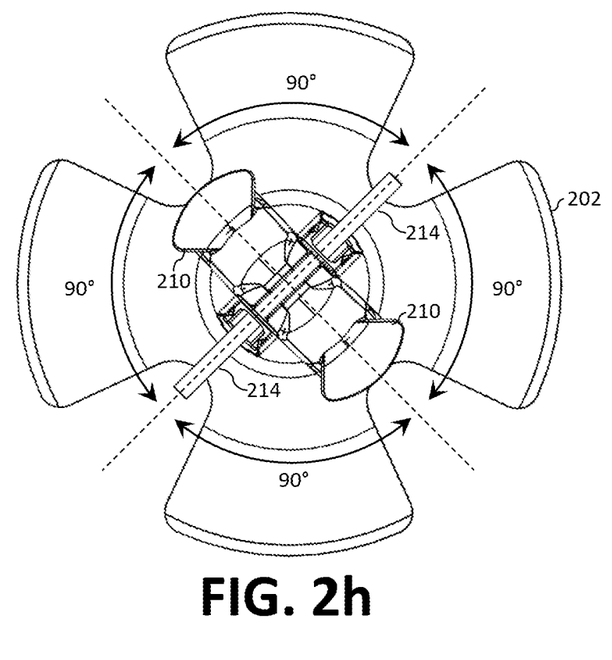

The PIA-retention features can, additionally or alternative, be provided as one or more whiskers 214 resiliently coupled to the shank 204 and angled away from the central longitudinal axis 222. As best illustrated in FIGS. 2e and 2f, each of the pair of whiskers 214 is substantially perpendicular to the central longitudinal axis 222.

Each of the first and second whiskers 214 are coupled to the shank 204 at its proximal end 214b such that its distal ends 214a extend outwardly. As illustrated, the pair of whiskers 214 are offset by about 180 degrees about the central longitudinal axis 222 such that the pair of whiskers 214 point in opposite directions. The whisker width ($W_2$) between the distal ends 214a of the first and second whiskers 214 is greater than the width of the first diameter ($D_1$). Each of the pair of whiskers 214 is configured to collapse against the shank 204 as indicated by arrows 220 during insertion of the pair of wings 206 through a second opening 112 formed in the first panel 110. The shank 204 may define at least one recess 216 configured to receive one of the pair of whiskers 214 during collapse thereof. As best illustrated in FIG. 2h, the pair of whiskers 214 are offset relative to the first and second fins 210 by about 90 degrees about the central longitudinal axis 222 (when both fins 210 and whiskers 214 are desired). As a result, the fastener 102 could be secured within the first opening 106 and configured to resist movement in both the lateral and transverse directions, thereby reducing any wobbling within the first opening 106.

Like the first and second wings 206a, 206b, the pair of whiskers 214 should be resiliently coupled to the shank 204 such that they do not increase the insertion force necessary to insert the clip assembly 102b through the second opening 112 of the second panel 110. For example, the pair of whiskers 214 can be sized such that they deflect easily when in the direction indicated by arrows 220. As a result, the fastener 102 would remain secured in the first opening 106 during shipping of the PIA component 108, but would not make it more difficult for an end-user to assemble the PIA component 108 with the second panel 110.

While only a single fastener 102, a single first opening 106 in the first panel 104, and a single second opening 112 in the second panel 110 are illustrated in the examples, it should be appreciated that a given first panel 104 may include multiple first openings 106 and the second panel 110 may include multiple second openings 112, depending on the number of fastener points to be used between the first and second panels 104, 110. For example, larger panels typically employ more fastener points.

In some examples, the fastener 102 may comprises a seal positioned at or adjacent the cap 202. For example, a seal may be used where it is desirable to mitigate dust, dirt, and/or moisture penetration through the first and second openings 104, 112. The seal may be embodied as a ring (e.g., an annulus) and fabricate from foam material, thermoplastic, rubber, etc. For example, as illustrated, a seal can be configured to surround the shank 204 between the first panel 104 and the second panel 110.

Figure 3A:
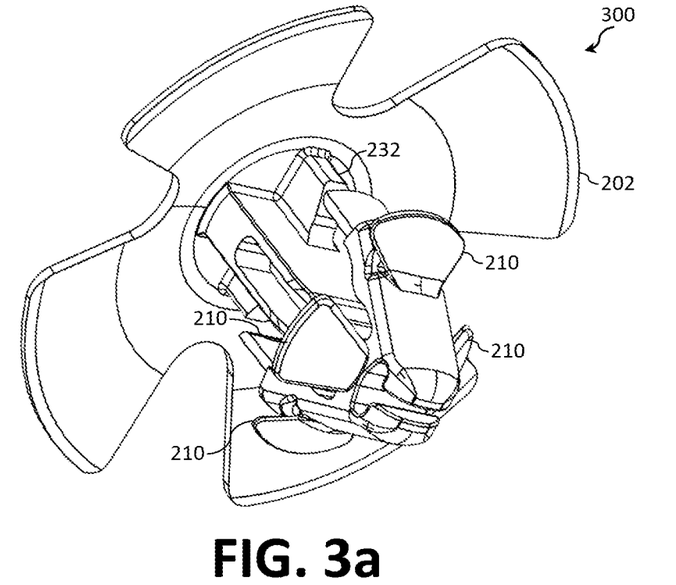
FIGS. 3a and 3b illustrate, respectively, underside isometric and bottom plan views of a fastener in accordance with another aspect of this disclosure.
Figure 3B:
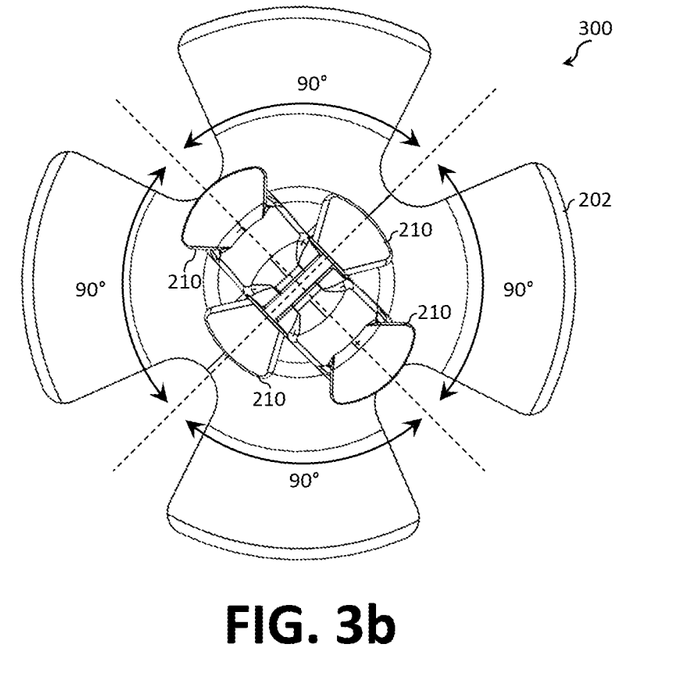

FIGS. 3a and 3b illustrate, respectively, underside isometric and bottom plan views of a fastener 300 in accordance with another aspect of this disclosure. In some examples, two sets of fins 210 can be used. For example, as illustrated, a second set of fins 210 are coupled to the shank 204 in lieu of a pair of whiskers 214. As best illustrated in FIG. 3b, the second set of fins 210 are similarly offset relative to the first sets of fins 210 coupled to the wings 206 by about 90 degrees about the central longitudinal axis 222. In another example (not illustrated), the two sets of fins 210 can be substituted with two sets of whiskers 214.

Figure 4A:
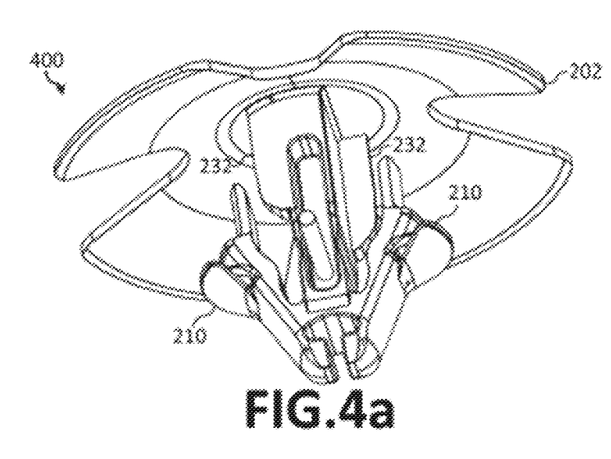
FIGS. 4a through 4d illustrate, respectively, underside isometric, side elevation, bottom plan, and cross-sectional views of a fastener in accordance with another aspect of this disclosure.
Figure 4B:
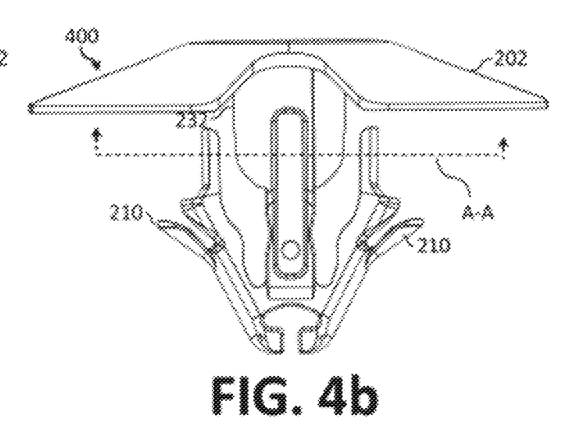
Figure 4C:
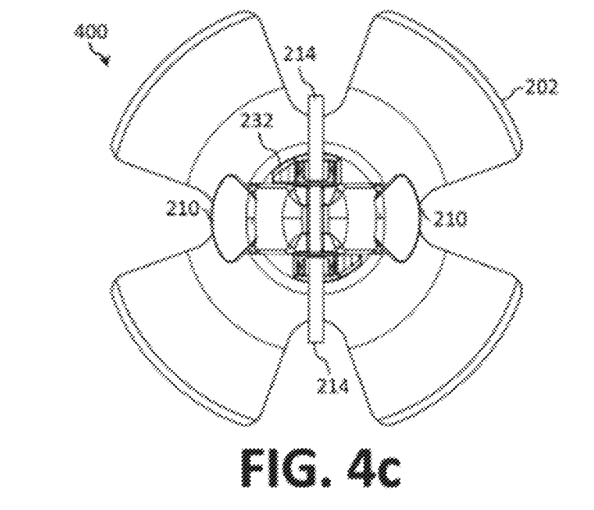
Figure 4D:
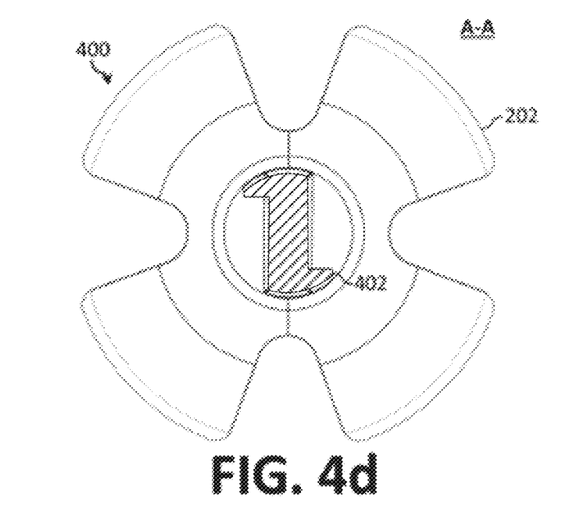

FIGS. 4a through 4d illustrate, respectively, underside isometric, side elevation, bottom plan, and cross-sectional views of a fastener 400 in accordance with another aspect of this disclosure. Specifically, FIG. 4d illustrates a cross-sectional view of the fastener 400 taken along the cut line A-A, which is illustrated in FIG. 4b. As best illustrated in FIG. 4d, the pair of ribs 232 adjacent the head assembly 102a can define a Z-shaped cross section 402. A Z-shaped cross section 402 can be used where, for example, the thickness of the first panel 104 and/or second panel 110 are thinner.

Figure 5:
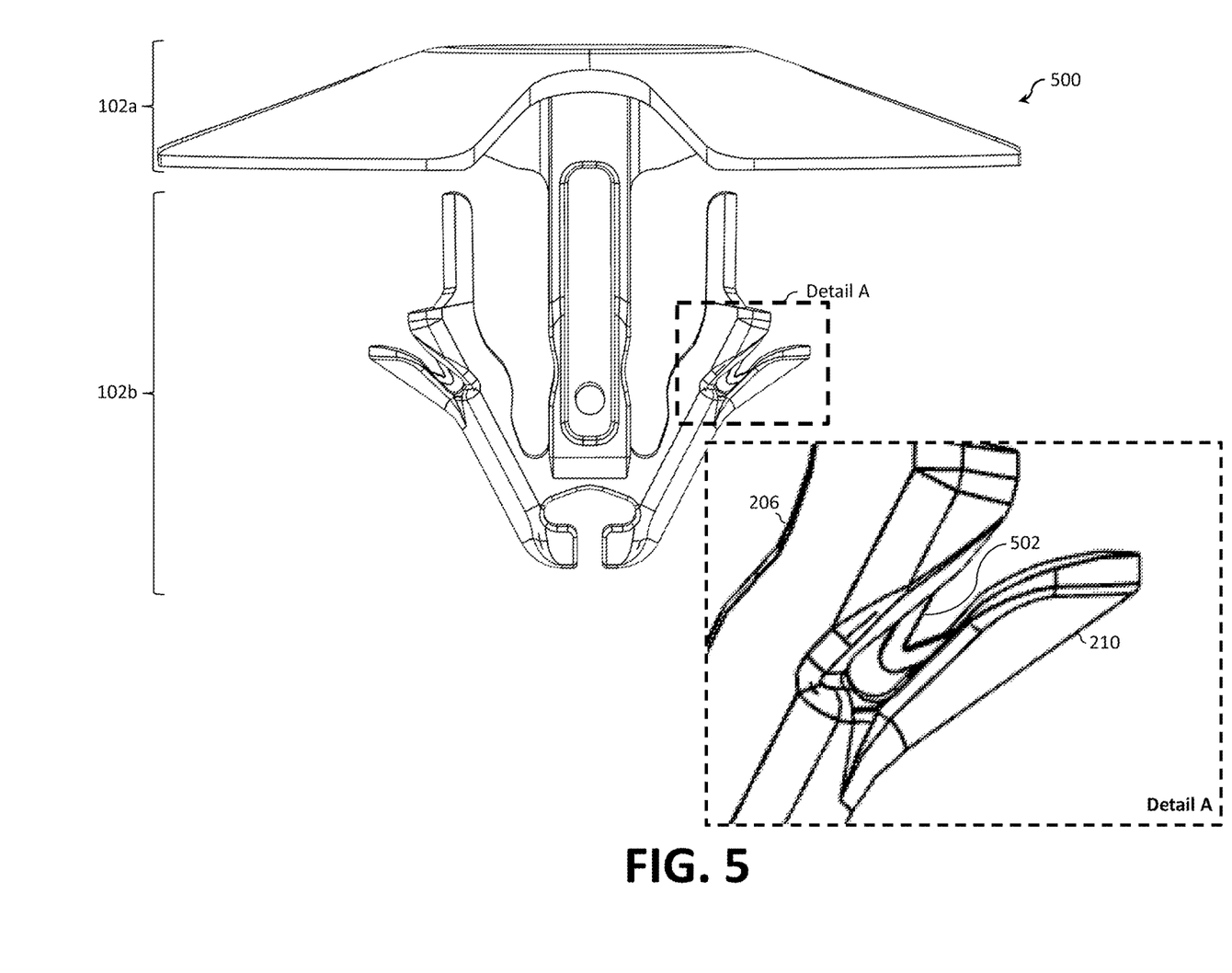
FIG. 5 illustrates a side elevation view of a fastener in accordance with yet another aspect of this disclosure.

FIG. 5 illustrates a side elevation view of a fastener 500 in accordance with yet another aspect of this disclosure. In some examples, as best illustrated in detail A, the fastener 500 includes tether 502 between each fin 210 and wing 206 (or other component to which the fin 210 is attached) to provide reinforcement when loading and to improve holding strength.

Figure 6A:
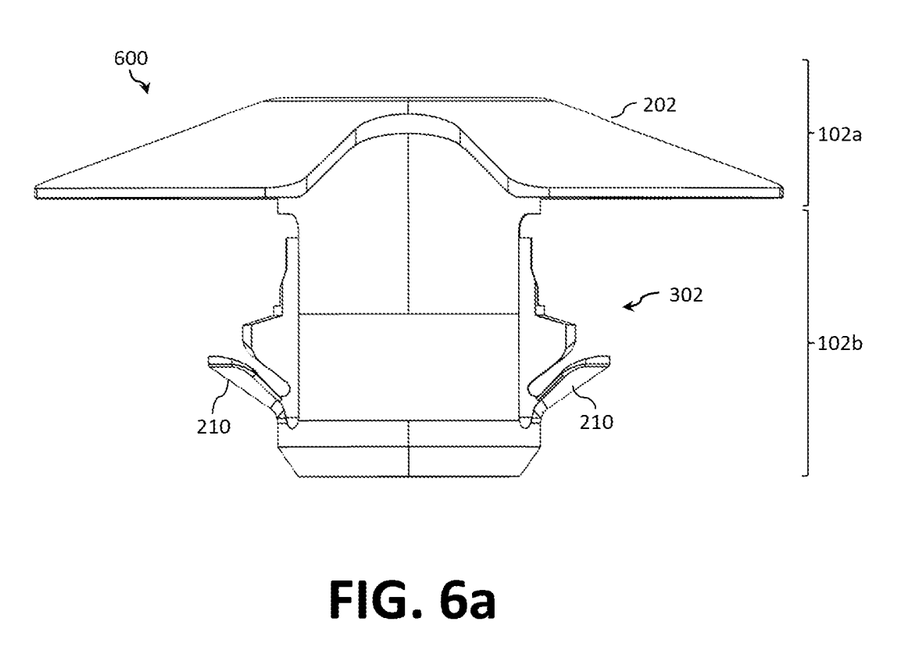
FIGS. 6a and 6b illustrate side elevation views of a fastener in accordance with yet another aspect of this disclosure.
Figure 6B:
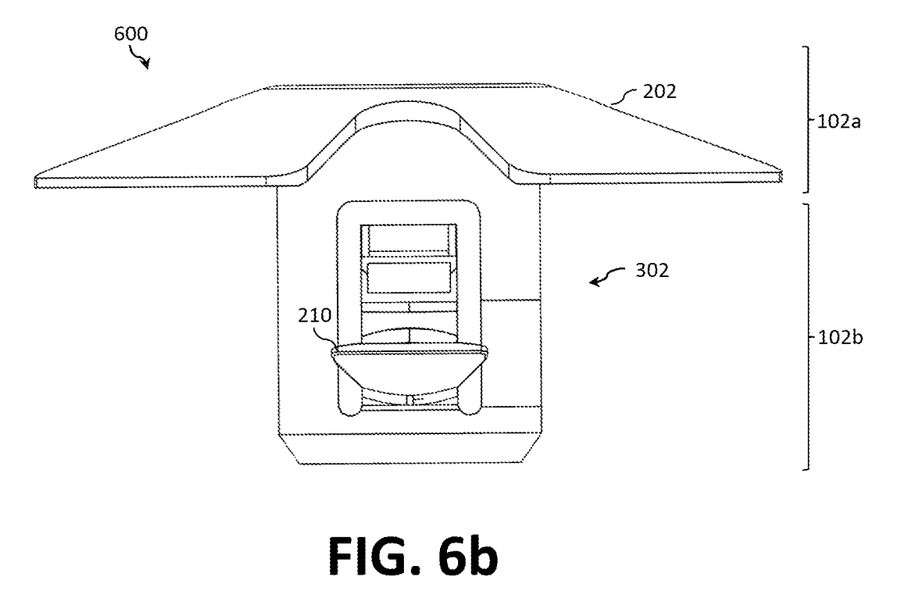

FIGS. 6a and 6b illustrate side elevation views of a barrel fastener 600 in accordance with yet another aspect of this disclosure. As mentioned above, the disclosed fins 210 and whiskers 214 can be used with fasteners other than W-type fasteners. To that end, in some examples, the clip assembly 102b is configured as a barrel fastener 600. As illustrated, a pair of fins 210 are coupled to (or formed on) the barrel clip 302 of the clip assembly 102b. The pair of fins 210 operate in substantially the same matter as the pair of fins 210 described in connection with FIGS. 2a through 2h. While a pair of fins 210 is illustrated, a pair of whiskers 214 can be used in addition to or in lieu of the pair of fins 210.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed:

1. A fastener for attaching a first panel to a second panel, the fastener comprising:
    a cap;
    a shank defining a central longitudinal axis that is substantially perpendicular to the cap;
    a pair of wings resiliently coupled to the shank at a distal end thereof and configured to retain the fastener relative to the second panel,
        wherein the pair of wings comprises a first wing and a second wing angled away from the central longitudinal axis;
    a first fin resiliently coupled to and angled away from the first wing; and
    a second fin resiliently coupled to and angled away from the second wing,
        wherein the first fin and the second fin are configured to retain the fastener relative to the first panel, and
        wherein a pair of whiskers is coupled to the shank at a coupling position substantially perpendicular to the central longitudinal axis and configured to further retain the fastener relative to the first panel while the first fin and the second fin are retaining the fastener relative to the first panel.

2. The fastener of claim 1, wherein the first fin and the second fin are configured to collapse against a respective one of the first wing and the second wing during insertion of the pair of wings through an opening formed in the first panel.

3. The fastener of claim 2, wherein each of the first wing and the second wing defines a recess configured to receive a respective one of the first fin and the second fin during collapse thereof.

4. The fastener of claim 1, wherein the pair of whiskers is resiliently coupled to the shank and angled away from the central longitudinal axis.

5. The fastener of claim 1, wherein each of the pair of whiskers is configured to collapse against the shank during insertion of the pair of wings through an opening formed in the first panel.

6. The fastener of claim 5, wherein the shank defines at least one recess configured to receive at least one of the pair of whiskers during collapse thereof.

7. The fastener of claim 1, wherein the central longitudinal axis is further defined by a radial center of the cap.

8. A fastener for attaching a first panel and a second panel, the fastener comprising:
    a cap;
    a shank defining a central longitudinal axis that is substantially perpendicular to the cap;

a pair of wings resiliently coupled to the shank at a distal end thereof, wherein the pair of wings comprises a first wing and a second wing angled away from the central longitudinal axis;

a first fin resiliently coupled to and angled away from the first wing;

a second fin resiliently coupled to and angled away from the second wing; and a pair of whiskers resiliently coupled to the shank and angled away from the central longitudinal axis, wherein each of the pair of whiskers is substantially perpendicular to the central longitudinal axis, wherein the first fin and the second fin are configured to retain the fastener relative to the first panel, and wherein each of the pair of whiskers is coupled to the shank at a coupling position configured to cause the pair of whiskers to further retain the fastener relative to the first panel while the first fin and the second fin are retaining the fastener relative to the first panel.

9. The fastener of claim 8, wherein the first fin and the second fin are configured to collapse against a respective one of the first wing and the second wing during insertion of the pair of wings through an opening formed in the first panel.

10. The fastener of claim 9, wherein each of the first wing and the second wing defines a recess configured to receive a respective one of the first fin and the second fin during collapse thereof.

11. The fastener of claim 8, wherein each of the pair of whiskers is configured to collapse against the shank during insertion of the pair of wings through an opening formed in the first panel.

12. The fastener of claim 11, wherein the shank defines at least one recess configured to receive one of the pair of whiskers during collapse thereof.

13. A part-in-assembly (PIA) component configured to engage a second opening of a second panel, the PIA component comprising:

a first panel having a first opening; and a fastener comprising a cap, a shank defining a central longitudinal axis that is substantially perpendicular to the cap, a pair of wings resiliently coupled to the shank at a distal end thereof and configured to engage the second opening, and a pair of PIA-retention features configured to engage the first opening, wherein the shank further defines a deflection controlling recess extending inwardly from the distal end of the shank, wherein the pair of wings comprises a first wing and a second wing angled away from the central longitudinal axis, wherein the first wing comprises a first fin resiliently coupled to and angled away from the first wing, and wherein the second wing comprises a second fin resiliently coupled to and angled away from the second wing, wherein the first fin and the second fin are configured to retain the fastener relative to the first panel, and wherein a pair of whiskers is coupled to the shank at a coupling position substantially perpendicular to the central longitudinal axis and configured to further retain the fastener relative to the first panel while the first fin and the second fin are retaining the fastener relative to the first panel.

14. The PIA component of claim 13, wherein the first panel is an automotive hood blanket.

15. The PIA component of claim 13, wherein the first fin and the second fin are configured to collapse against a respective one of the first wing and the second wing during insertion of the pair of wings through the first opening of the first panel.

16. The PIA component of claim 15, wherein each of the first wing and the second wing defines a recess configured to receive a respective one of the first fin and the second fin during collapse thereof.

17. The PIA component of claim 13, wherein the pair of whiskers is resiliently coupled to the shank and angled away from the central longitudinal axis.

18. The PIA component of claim 17, wherein the shank defines at least one recess configured to receive one of the pair of whiskers during collapse thereof.

19. The PIA component of claim 13, wherein each of the pair of whiskers is configured to collapse against the shank during insertion of the pair of wings through the first opening of the first panel.

* * * * *